W. L. BAKER.
GEAR SHIFTER.
APPLICATION FILED JUNE 9, 1917.
1,285,587.
Patented Nov. 26, 1918.
2 SHEETS—SHEET 1.
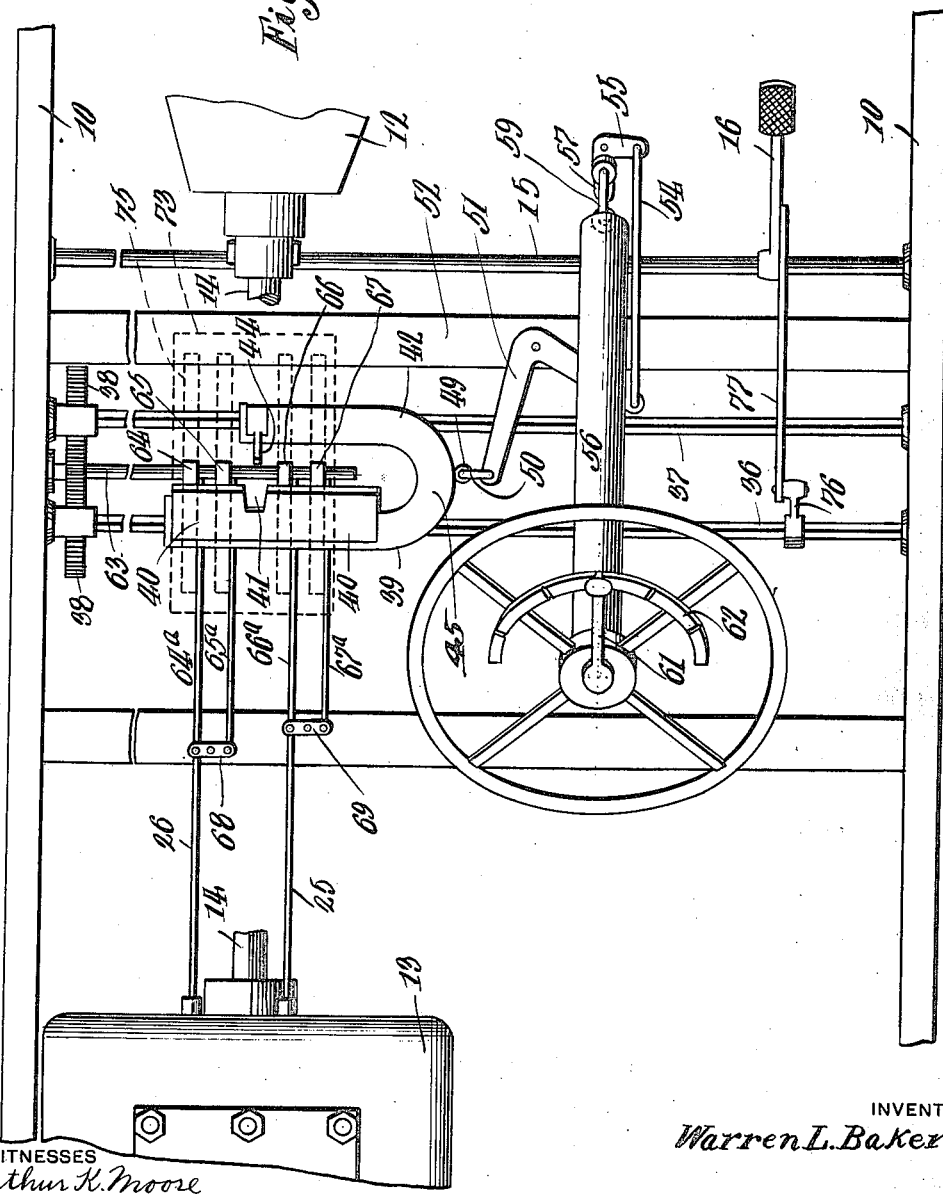
WITNESSES
Arthur K. Moore
Wm Zeaman
INVENTOR
Warren L. Baker
BY Richard B. Owen
ATTORNEY

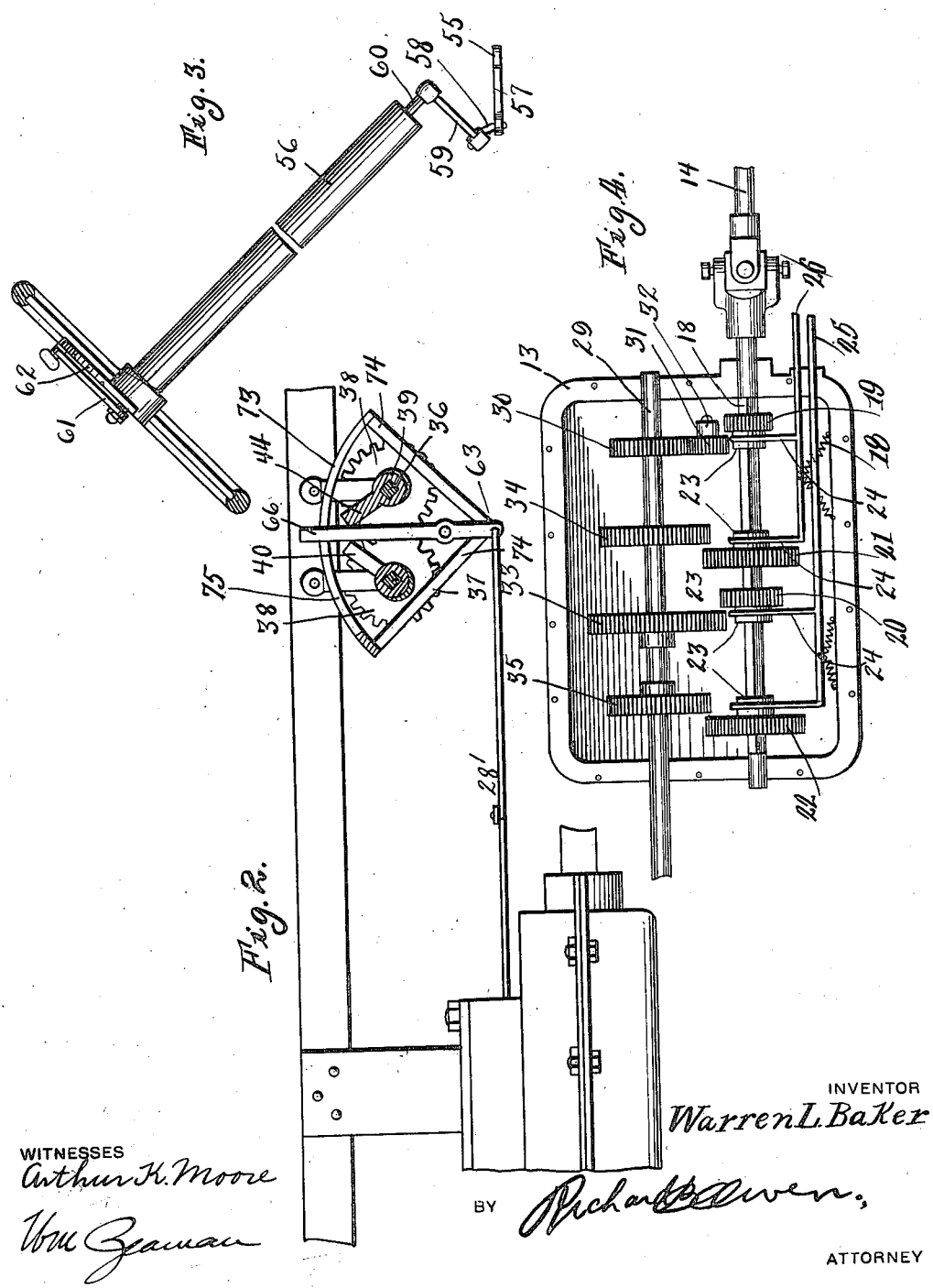

UNITED STATES PATENT OFFICE.

WARREN L. BAKER, OF PIERSON, IOWA.

GEAR-SHIFTER.

1,285,587.

Specification of Letters Patent.

Patented Nov. 26, 1918.

Application filed June 9, 1917. Serial No. 173,868.

*To all whom it may concern:*

Be it known that I, WARREN L. BAKER, a subject of the King of Great Britain, residing at Pierson, in the county of Woodbury and State of Iowa, have invented certain new and useful Improvements in Gear-Shifters, of which the following is a specification.

This invention has relation to transmissions for motor vehicles and the primary object of the invention is to provide an improved transmission and controlling mechanism therefor which controlling mechanism is operable from the steering wheel of the vehicle thereby permitting speed changes with ease and facility.

Another object of the invention is to provide an improved means for shifting gears, of a transmission for motor vehicles adapted for association with a control mechanism located in the steering wheel as mentioned above.

A still further object of the invention is to provide an improved transmission including shiftable gears adapted to be operated by my gear shifting mechanism.

In addition to the foregoing my invention comprehends improvements in the details of construction and arrangement of the parts to be hereinafter more fully described and particularly set forth in the appended claims.

In the accompanying drawings similar and corresponding parts are designated by the same characters of reference throughout the several views in which they appear:

Figure 1, is a view in plan of a portion of the chassis of a motor vehicle, illustrating the embodiment therein of my transmission and operating mechanism therefor.

Fig. 2, is a view in longitudinal and vertical section taken on the line 2—2 of the preceding figure.

Fig. 3, is a view in section of a conventional form of vehicle steering wheel in which my gear shifting control is embodied.

Fig. 4, is a view in plan of my improved transmission with the casing cover thereof removed, to disclose the interior.

With reference to the drawings 10 indicates the longitudinal side members of a chassis frame, 12 conventionally the clutch, and 13 the transmission located rearwardly of the vehicle with the power shaft 14 extending therebetween. A transversely extending clutch shaft 15 is mounted at either end in suitable bearings located upon the members 10 of the chassis, a clutch pedal 16 being rigidly secured to said shaft to oscillate the same after the usual manner. A shipper lever 17 is secured upon an intermediate portion of the clutch shaft 15 whereby to actuate the clutch in the usual manner. For the purposes of my invention, the clutch mechanism is of that type wherein forward pressure upon the clutch pedal 16 acts to disengage the clutch, the clutch being automatically reëngaged by means (not shown) when the clutch pedal is released.

In Fig. 4 of the drawings I have disclosed in detail a transmission designed for use in connection with my gear shifting mechanism, the power shaft 14 being extended into the casing, and formed with a rectangular portion 18.

Reverse, low, medium and high speed gears 19, 20, 21 and 22 respectively, are mounted on the squared portion of the power shaft for rotation therewith and for longitudinal sliding movement thereon. Each gear being provided with a collar 23 having a circumferential groove. Shipper levers 24 of the gears 20 and 22 are extended laterally from a longitudinally slidable rod 25, and engaged in the grooves of the collars; while similarly levers 24 of the gears 19 and 21 are extended from a rod 26 for engagement with the collars of said gears. It will be obvious that by sliding any one of these rods longitudinally and forwardly, its respective gears will be correspondingly moved forward or rearward for engagement with a meshing gear to be now described. A second shaft 29 is journaled within the casing 13 in parallelism to the shaft 14, said shaft extending rearwardly to the differential for imparting its rotative motion to the rear axle of the vehicle. The propeller shaft 29 has fixedly secured thereto within the casing a reverse gear 30 which constantly meshes with a pinion 31 within the casing journaled in a suitable bearing 32, whereby when the reverse gear 19 of the shaft 18 is moved forward, said gear 19 may be brought into meshing engagement with the gear 31 so that its rotative movement may be imparted eventually to the gear 30 but in a direction reverse from that of the drive shaft 14. Gears 33, 34 and 35, are also fixedly secured to the propeller shaft 29 within the casing for meshing engagement respectively with the gears 20, 21 and 22.

Extending transversely of the vehicle are a pair of squared shafts 36 and 37 journaled at opposite ends in suitable bearings mounted upon the side members 10 of the vehicle frame, said shafts mounted upon the side members 10 of the vehicle frame, said shafts being disposed in spaced relation and in the same horizontal plane. Mounted upon each shaft is a gear 38 for mutual meshing engagement whereby to cause said shafts to rotate in unison and in opposite directions. Slidably mounted upon the shaft 36 is a sleeve 39 having a portion cut away to receive a sleeve 40 which is slidably mounted on the shaft 36. The sleeve 40 is formed with a blade having a notch 41 formed in its outer edge intermediate the ends thereof. A sleeve 42 is also slidably mounted upon the shaft 37 with one end of said sleeve cut away to receive a collar having a radial arm 44 formed therewith which is normally disposed opposite the notch 41 of the blade mentioned above. Said sleeves 39 and 42 are integrally connected at adjacent ends and shiftable in unison so as to also shift the sleeve 40 and the collar carrying the arm 44 along their respective shafts. To that end the sleeves 39 and 42 are joined by an integrally formed connecting portion 45 shown more clearly in Fig. 1 of the drawings. An apertured lug 49 is formed upon the portion 45 and a link 50 connects said lug to one arm 51 of a bell crank pivotally mounted upon a transversely extending beam 52 which is anchored at either end upon the side members of the chassis frame, the other arm 53 of said bell crank having a connection through the medium of a link 54 with a bell crank 55 located adjacent the lower end of the steering column 56 of the motor vehicle. The opposite arm 57 of the bell crank 55 is connected through the medium of a pin 58 to an arm 59 which is secured to the lower end of a rod 60 which passes up through the steering column 56 and is provided at its upper end with a manually operable arm 61 which rides over a segment 62 fixedly secured to the steering column. From the foregoing it will be obvious that by swinging the arm 61, its motion is transmitted through the medium of the rod 60, through the arm 59, bell crank 55, bell crank 61, whereby to shift the sleeves 39 and 42 longitudinally upon their respective supporting shafts in one direction or the other as the case may be.

Located between the squared shafts 36 and 37 and disposed therebeneath is a shaft 63 disposed parallel to the mentioned squared shafts, for the purpose of supporting in fixed engagement thereon normally upstanding levers numbered 64, 65, 66 and 67 intended for shifting respectively the rods numbered 25 to 28 inclusive. Each of said levers 64 and 65 are connected to opposite ends of a rocking lever 68 mounted on a transverse frame bar rearwardly of the said levers, said rocking lever being pivoted at a point intermediate its ends; the rods 66ª and 67ª being similarly connected to a rocking lever 69 similarly mounted. The outer extremity of the aforesaid gear shifting rod 25 is now connected to the end of the rocking lever 69 to which the rod 66ª is connected, and the extremity of the gear shifting rod 26 is similarly connected to the end of the rocking lever 68 to which the rod 64ª is connected. To guide the levers 64 to 67 for oscillation longitudinally of the vehicle, I provide a guide frame 73, which is curved on and supported at opposite ends upon braces 74 loosely mounted on the shaft 63 so as not to rotate therewith, said guide plate 73 having arcuate slots 75 cut therein through which the mentioned levers are adapted for movement. It is to be noted, at this point that the arms 40 and arm 44 are normally extended toward each other and in an upward direction at an angle to the vertical in a position for engagement with the levers 64 to 67 in a manner which will be presently obvious.

Fixedly secured to the squared shaft 36 is an arm 76 and a link 77 connected to the extremity of said arm with the clutch pedal 16 mentioned above.

In neutral position of the transmission gears, the arm 61 located adjacent the steering wheel, is intended to be positioned at a point substantially intermediate the end of the arcuate member 62 as illustrated in Fig. 1 of the drawings, and in this position of the arm, the arms 40 of the sleeve 49 will be located so as to dispose the space 41 therebetween opposite the space between the levers 65 and 66 so that the arm 44, if moved may enter said space between the levers without engaging the same. Continued movement of said arm 44 will eventually cause the same to enter the space 41 between the arms 40 without affecting any of the mechanism. Therefore, if the clutch pedal 16 is released, the motion thereof will be transmitted along the link 77 to the arm 76 whereby to rotate the squared shaft 36 and eventually the shaft 37, the arm 44 thus being moved into the recess 41.

To select a certain speed ratio, the arm 61 mounted adjacent the steering wheel is rotated from its neutral position in one direction or the other as the case may be, such movement of the arm being transmitted in a manner explained above to the sleeves 39 and 42. If the pointer on the arm 61 is located properly with reference to one of the graduations upon the segments 62 the arm 44 of the sleeve 42 will be brought opposite the corresponding lever of the series 64 to 67, the arms 40 being moved in unison to locate the space 41 therebetween opposite the lever selected. The proper gear having been selected, to effect an engagement thereof it is but necessary to press forward the clutch pedal 16 whereupon the motion thereof will be transmitted to the squared shaft 36 and thence to the shaft 37 whereby to rotate the collar to bring the arm 44 of said collar into engagement with the lever selected whereby to move the lever forward and into the space 41 of the blade. Such movement of the selected lever will be transmitted along its corresponding links 64ª and 67ª to its associated rod 25 or 26 the motion of said lever being in turn transmitted to the gear connected to said rod whereby to shift the said gear into engagement with its mating gear on the shaft 29. For instance if the lever 64 is moved forward the rod 26 will be moved forward and the gear 21 thereby moved into engagement with the gear 34. If however, the gear 65 is selected and moved forward, the said rod 26 will be moved rearward, the gear 19 brought into engagement with the idler pinion 31 and a reverse drive will be effected. It will be obvious from the foregoing that a movement of the clutch pedal to throw the clutch out of engagement will likewise disengage the selected gears, the blade 40 acting as a means to return the levers of the series 64 to 67 each time, back to their normal position. The return of the gears to their original position may be insured through the medium of coil springs 78 which may be connected to the respective rods 25 and 26 and anchored within the casing for this purpose.

While I have illustrated and described my invention with some degree of particularity, I realize that in practice various alterations thereover may be made, and I therefore desire to reserve the right and privilege of changing the form of the details of construction, or otherwise altering the arrangement of the correlated parts without departing from the spirit of the invention or the scope of the appended claims.

Having thus described my invention what I claim as new and desire to secure by Letters Patent is:—

1. In a motor vehicle, the combination of a transmission including a plurality of shiftable gears, a plurality of movable levers for shifting the gears, a movable element carrying a selecting arm for movement into proximity to any one of the levers, manually operable means located on the steering wheel and having connection with the selecting means to move the same, means operable by the clutch pedal when moved to disengaging position to engage and move the selecting arm into engagement with the lever selected whereby to shift the gear selected, said manually operable means when returned to neutral position being operable to correspondingly move the selecting arm out of engaging proximity to any of the levers, and means operable by the clutch pedal when the same is returned to released position to return the lever moved to original position.

2. In a motor vehicle, the combination of a transmission including a plurality of shiftable gears, a plurality of levers for shifting the gears, movable selecting means including an oscillatable arm for movement into proximity to any one of the levers for engaging the same, an oscillatable shiftable arm movable in opposition to the selecting arm means for insuring rotation of said arms in unison and in opposite directions means mounted on the steering wheel for shifting the arms in unison, and means operable by the clutch pedal for oscillating the selecting arm whereby to engage and move a lever selected to shift the selected gear, the clutch pedal when moved to released position permitting the second mentioned arm to engage the lever selected to return the same to normal position.

3. In a motor vehicle, the combination of a transmission including a plurality of shiftable gears, a plurality of levers oscillatable about a common axis normally in parallelism for shifting the gears, shiftable and oscillatable selecting arms for movement into proximity to any of said levers, a pair of arms shiftable and oscillatable in opposition to the selecting arms, means for causing oscillation of said arms in unison and toward each other and for permitting said arms to move toward each other without mutual engagement, means operable from the steering wheel for shifting said arms in unison, and means operable by the clutch pedal when moved to engaging position to cause said selecting arm to engage and move the lever selected whereby to shift the selected gear, said last mentioned means being operable when the clutch pedal is released to move the selecting arm out of engaging proximity to the lever and to cause the second mentioned arm to engage the lever selected to return the same and the shifted gear to normal position.

4. In a motor vehicle, the combination of a transmission including a plurality of shiftable gears, a plurality of levers oscillatable about a common axis and normally in parallelism, means connecting the several levers to their respective gears for shifting the same, a pair of shiftable elements, one of said elements carrying a selecting arm for movement into proximity to any of the levers, the other movable elements carrying a pair of spaced arms, means for insuring rotation of said elements in unison and in opposite directions to bring the arms toward each other, the selecting arm being adapted for movement into the space between the second mentioned arms, means operable from the steering wheel for shifting said arm whereby to permit the selecting arm to move into proximity to a lever to be selected, and means operable by the clutch pedal when moved to engaging position to cause said arms to engage the lever selected whereby to shift the selected gear, said last mentioned means being operable when the clutch pedal is released to cause the spaced arms to engage the lever moved to return the same and the selected gear to normal position.

5. In a motor vehicle, the combination of a gear shifting device including a plurality of levers oscillatable about a common axis normally in parallelism, a pair of shiftable elements, one of said elements carrying a selecting arm for movement into proximity to any of the levers, the other shiftable element carrying a pair of spaced arms, means for insuring rotation of said elements in unison and in opposite directions to bring the arms toward each other, the selecting arm being adapted for movement into the space between the second mentioned arms, means for shifting said shiftable elements whereby to permit the selecting arm to move into proximity to a lever to be selected, and means for rotating said shiftable element to cause said arm to engage the lever selected whereby to oscillate the same.

In testimony whereof I affix my signature in presence of two witnesses.

WARREN L. BAKER.

Witnesses:
J. C. SADLER,
WEIR WHITMER.